Feb. 21, 1939. W. A. CLEMENTS 2,148,014
SPRING SUPPORT FOR VEHICLES
Filed Oct. 28, 1937 6 Sheets-Sheet 1

INVENTOR
WILLIAM ALEXANDER CLEMENTS
By Stebbins, Blenker Parmelee
ATTORNEYS

Feb. 21, 1939.  W. A. CLEMENTS  2,148,014
SPRING SUPPORT FOR VEHICLES
Filed Oct. 28, 1937   6 Sheets-Sheet 5

INVENTOR
WILLIAM ALEXANDER CLEMENTS
BY Stebbins, Blenko + Parmelee
ATTORNEYS Feb. 21, 1939.   W. A. CLEMENTS   2,148,014
SPRING SUPPORT FOR VEHICLES
Filed Oct. 28, 1937   6 Sheets-Sheet 6

INVENTOR
WILLIAM ALEXANDER CLEMENTS
By Stebbins, Blenko & Parmelee
ATTORNEYS

Patented Feb. 21, 1939

2,148,014

UNITED STATES PATENT OFFICE 2,148,014

SPRING SUPPORT FOR VEHICLES

William Alexander Clements, Kettering, England

Application October 28, 1937, Serial No. 171,405
In Great Britain November 13, 1936

13 Claims. (Cl. 267—19)

This invention relates to spring supports for vehicles of the type (hereinafter referred to as the type described) wherein a main oscillatory spring has associated with it an auxiliary oscillatory spring which serves to carry the weight or part of the weight of the vehicle and its load.

The invention has for one of its objects to provide an improved construction of spring support of the type described which shall be more flexible than those proposed heretofore and shall result in greater comfort to passengers and reduced vibration to goods carried in a vehicle equipped with the improved means of spring support.

According to the invention there is provided a spring support of the type described, wherein the auxiliary spring is so mounted between a lower supporting member and an upper member supported by it that one end portion of it is free to move in relation to the other end portion and also in relation to the respective lower or upper member in the direction of length of the vehicle for permitting the mechanical advantage of the force acting to compress the spring to increase as the reaction of the spring against compression increases.

Conveniently, the said end portion of the auxiliary spring is of elongated form and extends at an angle other than a right angle towards the member on which it is free to move, and the line of action of the compressing force passing through it does not extend through its other end.

Preferably, the auxiliary spring is a helical spring having one end extended away from its coiled portion to bear against the lower or upper supporting or supported member, in relation to which it is free to move.

The auxiliary spring may be arranged between the chassis or a part carried thereby, and a support that is substantially parallel thereto and is constituted by a pivoted member, such as a plate or link, that extends in the direction of length of the vehicle and has one end pivoted to the chassis or to a part fixed thereto, and its other end operatively connected to a part of the vehicle towards and away from which the chassis can move in an approximately vertical direction.

The pivoted supporting member may have its pivotal connection to the chassis cushioned, for the purpose of absorbing shocks, and its other end attached by resilient means to the part of the vehicle to which it is connected.

According to a feature of the invention the auxiliary spring is mounted to move bodily in the fore-and-aft direction of the vehicle for varying the mechanical advantage with which it acts and consequently its lifting power.

Preferably, the auxiliary spring is provided with adjusting mechanism for moving it in opposite directions, and actuating means operated under the action of variable vehicle loads is arranged to actuate said adjusting mechanism.

The actuating means may be operated by the approximately vertical movements of the pivoted member of the two members between which the auxiliary spring is situated.

Conveniently, the auxiliary spring has one end coiled about a transverse bar, an adjusting screw is arranged to move the bar in direction of length of the vehicle, and means is provided for turning the screw under the action of variable vehicle loads.

Other features of the invention relate to the mounting of the said transverse bar and to means for automatically turning the adjusting screw under the action of a varying vehicle load.

The invention is diagrammatically illustrated by way of example in the accompanying drawings, wherein.

Like reference characters designate like parts throughout the several views.

Referring to the drawings, the chassis comprising longitudinals 10, 11 and a rear transverse member 12, may be provided with any convenient or known construction of main oscillatory springs, in association with which two pairs of auxiliary helical springs 14, 15 and 16, 17 are provided, as described hereinafter at opposite sides of the chassis between the longitudinals. In front of the road wheel axle 18 and parallel therewith a transverse shaft 20 is mounted in brackets 22, 23 depending from the longitudinals. This shaft 20 carries a pivotal support for the front end of a support of the auxiliary springs as described hereinafter. This support comprises two plates or links 24, 25, one for each pair of auxiliary springs. As these plates are alike, a description of one will suffice for both.

Figure 5:
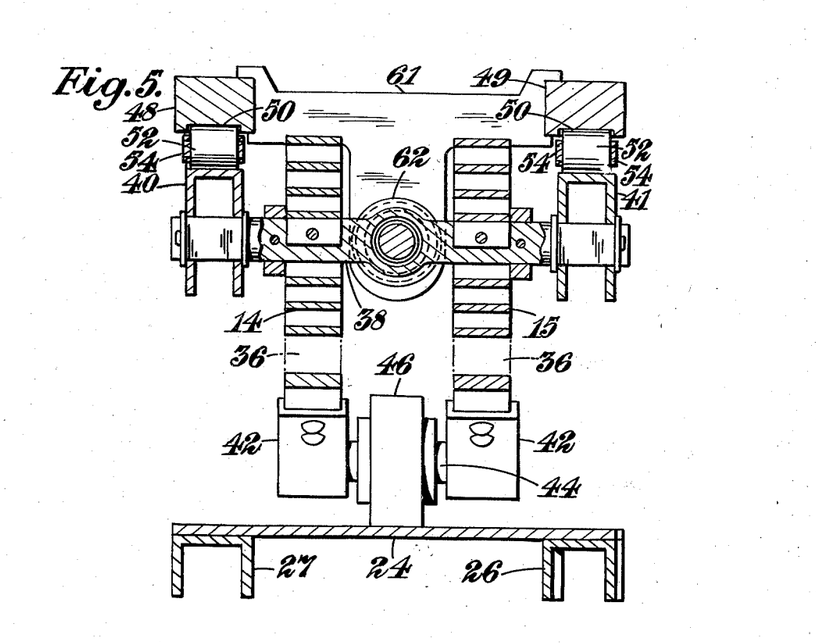
Figure 5 is an enlarged transverse section taken on the line 5—5 in Figure 2.

As shown most clearly in Figures 5 and 6, the plate 24 has below its opposite longitudinal edges two reinforcing channels 26, 27 of inverted U-section, the front ends of which carry a hinge pin 28, and the rear ends of which embrace and are rigidly fixed to the casing 30, so that the two plates 24, 25 virtually constitute a single supporting member. A box-shaped hinge member 32 fixed to the shaft 20 contains a block of rubber 34 through which the pin 28 extends, so that the pivotal connection of each plate 24, 25 with the shaft 20 is cushioned for the purpose of absorbing shocks.

The mounting of the auxiliary springs will now be described with reference to the pair 14, 15 thereof. As shown most clearly in Figures 1, 3 and 4, each of these springs comprises a helically wound portion and an elongated end portion 36. As shown in Figure 5, each helical portion is secured at its inner end to a transverse bar 38 which is carried non-rotatably by its ends in two longitudinal beams 40, 41 of inverted U-section. The ends of the elongated portions 36 are both secured by attachment members 42 to the ends of a short axle 44 carrying an anti-friction roller 46 arranged to run on the plate 24. The two beams 40, 41 respectively underlie longitudinal frame members 48, 49 having a shallow groove 50 in the underface thereof for receiving anti-friction rollers 52 which are connected together by links 54 and lie between the beams 40, 41 and the members 48, 49 above them.

In order to move the pair of springs bodily in the fore-and-aft direction of the vehicle for varying the mechanical advantage of the supporting plate 24 acting on them, mechanism comprising a screw-threaded spindle 56 is provided. This spindle is rotatably mounted at its ends in brackets 58, 59 attached to the underside of the members 48, 49 and has threaded connection with two cross-pieces 60, 61 that are situated between and slidable along the members 48, 49 when the spindle 56 is rotated as described hereinafter. The centre portion of the transverse bar 38 is formed as a flange sleeve 62 which surrounds the threaded spindle 56 with play. Two compression coil springs 64, 65, or any desired number of spring washers constituting buffers are placed between the flanged ends of the sleeve 62 and the cross-pieces 60, 61 so that the transverse bar 38 has a resilient floating connection with the adjusting spindle 56, thereby ensuring that sudden rotary movements of the spindle 56 will not be suddenly transmitted to the transverse bar 38.

When the chassis moves approximately vertically under the action of variable vehicle loads, the plate 24 will vibrate in a vertical direction and its movement when exceeding a predetermined amount from an approximately horizontal position, can be transmitted to the threaded spindle 56 by actuating mechanism comprising two lever arms 68, 69. Each of these arms is carried by or forms part of a one-way clutch device on the threaded spindle 56, which clutch devices act in opposite directions, so that rocking movements of the arms rotate the spindle 56 in the opposite directions. Two springs 84, above these arms, and two springs 85, below them, tend to hold the arms in a horizontal position. For rocking these arms a device having lost motion is provided. As illustrated in Figures 1 to 6, this device is in the form of two upstanding rods 70, 71 that extend freely through holes 72, 73 in the plate 24 and respectively carry two stops 74, 75 spaced apart, one above and the other below the holes. The upper ends of these rods are respectively connected by swivelling or universal joints 76, 77 to the arms 68, 69. Consequently, if the vehicle load is so great that the auxiliary springs are compressed and occupy the position shown in Figure 4, in which position the upper stop 74 bears against the plate 24, vibration of the plate 24 will operate the arm 68 to turn the threaded spindle 56 in a direction to move the auxiliary springs towards the rear wheel axle. If the vehicle load is lighter and the stop 75 becomes operative then the arm 69 will rotate the spindle 56 in the opposite direction and move the auxiliary springs towards the front of the vehicle. In the rear position of the spring shown in Figure 4, it will be observed that the distance of the roller 46 from the pivotal axis 20 of the plate 24 is greater than the corresponding distance between the same parts shown in Figure 3. The plate 24 and frame members 48, 49 form a pair of "nut crackers", the coil spring 14 representing the nut. When the spring is brought near the hinge the "nut crackers" less force is required to compress it. Conversely, the further the spring is situated away from the hinge the greater the force necessary to compress it, and the greater vehicle load it will support.

Figure 1:
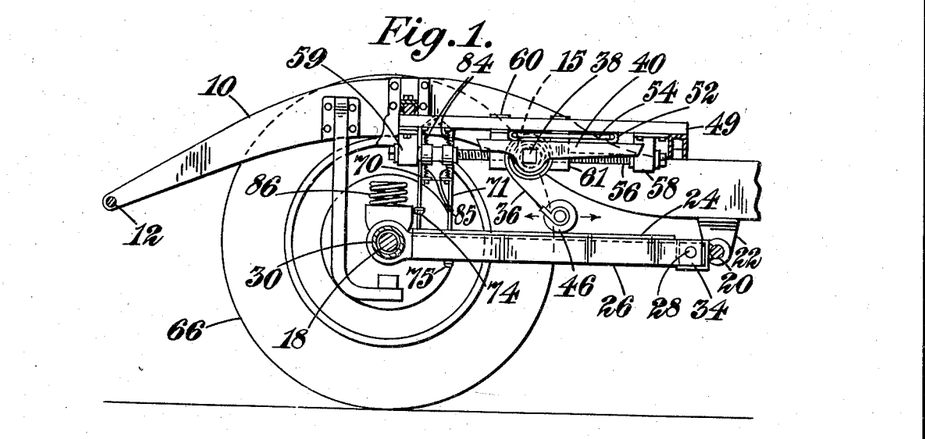
Figure 1 is a longitudinal sectional elevation, taken on the line 1—1 in Figure 2, showing one form of spring support according to the invention for use in a vehicle.
Figure 2:
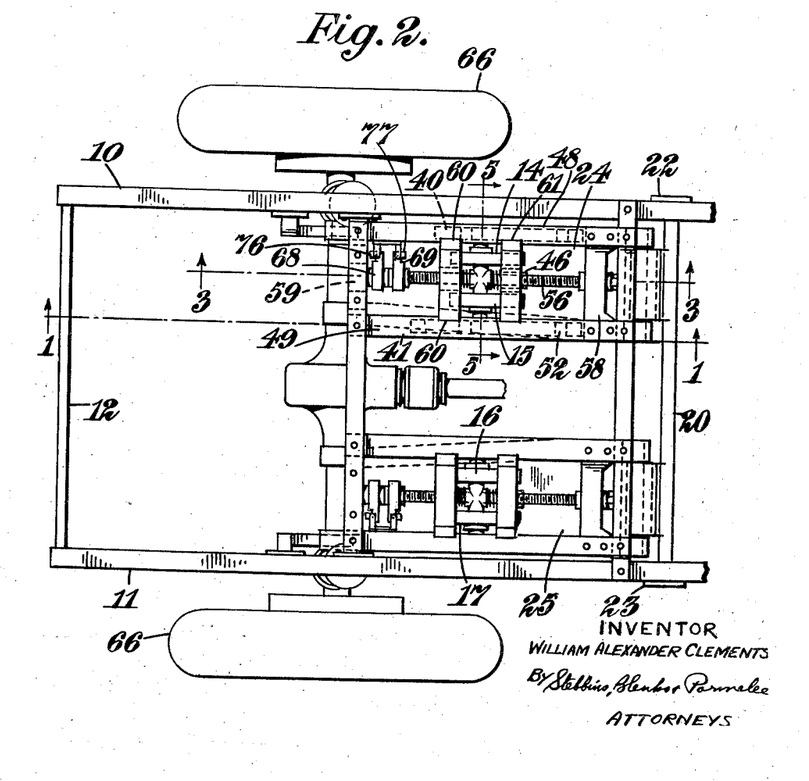
Figure 2 is a plan view thereof.
Figure 3:
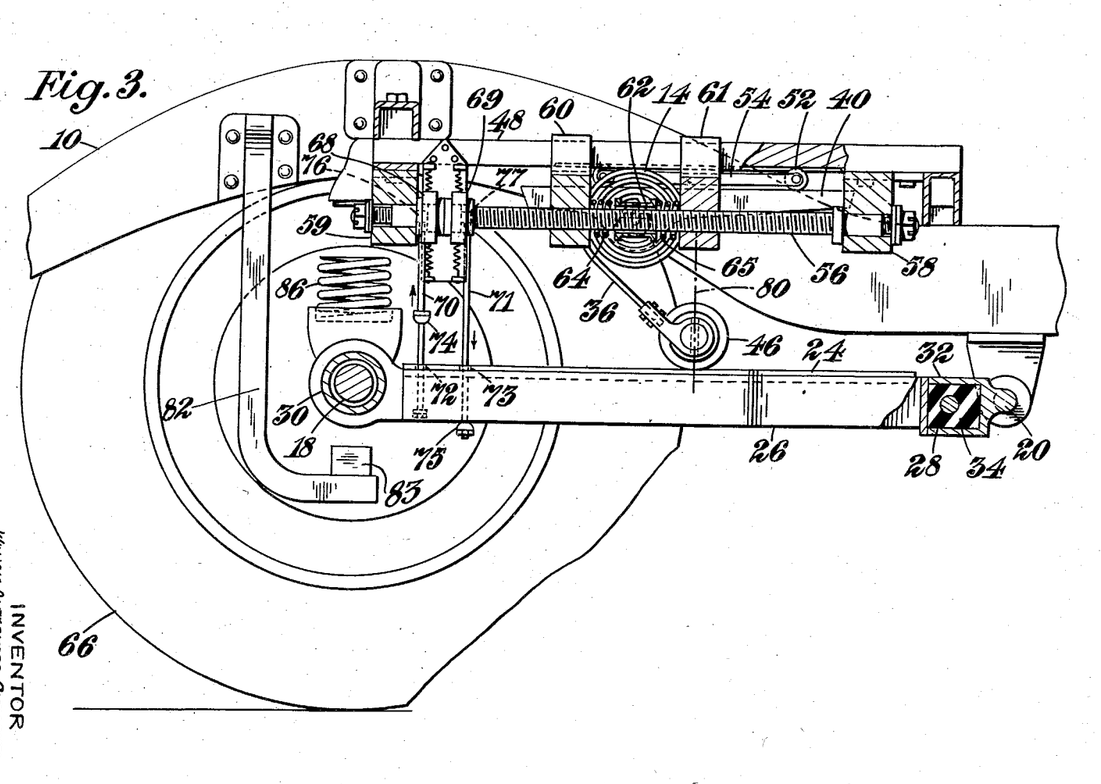
Figure 3 is an enlarged longitudinal sectional elevation taken on the line 3—3 in Figure 2.
Figure 4:
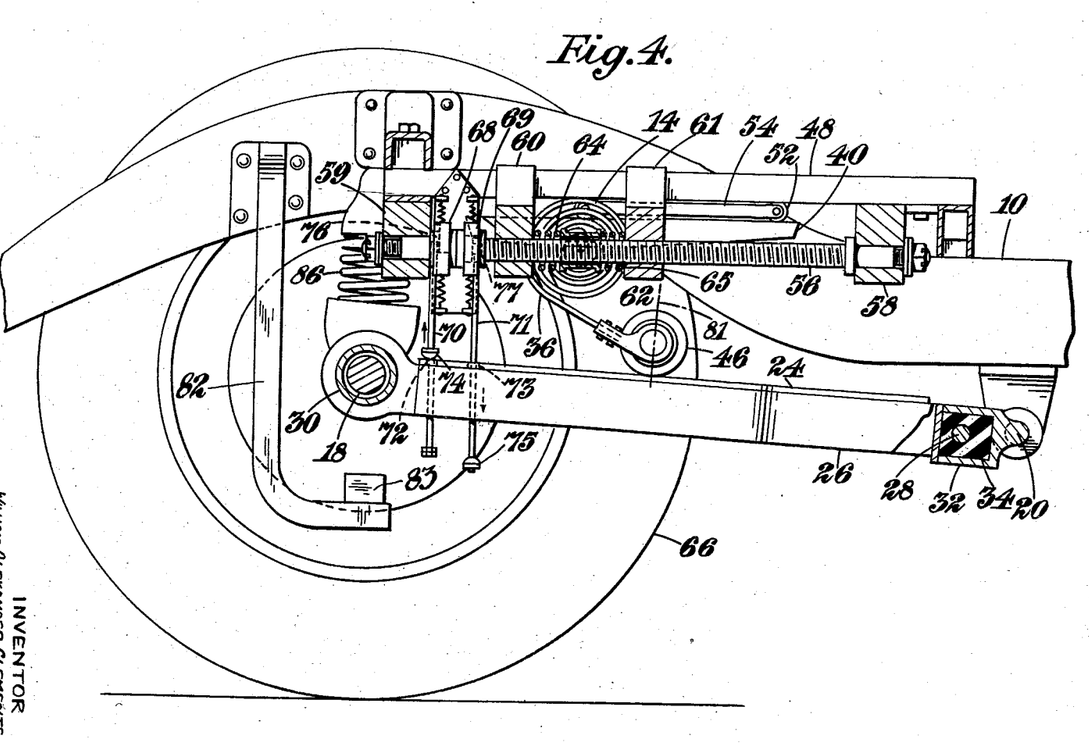
Figure 4 is a view similar to Figure 3 but showing the parts in a different position.

By referring particularly to Figures 1, 3 and 4, it will be observed that the end portion 36 of each auxiliary spring of elongated form extends at an angle other than a right angle towards the plate 24 supporting it. The lines of action of the spring-compressing force are indicated at 80 in Figure 3 and at 81 in Figure 4. As the spring is compressed the line of action along which the compressing force acts passes through points increasingly distant from the point of fixed attachment of the spring. The result of this arrangement is to provide a spring suspension which through a limited range of action, requires only a slight increase of compression stress to cause the spring to be compressed from its most extended to its fully compressed position. In other words, a very soft resilient support is provided which is only suitable for a substantially uniform compression stress on the spring itself.

In order to adapt a spring of approximately uniform reaction to compression stresses due to varying vehicle loads, its mechanical advantage in supporting the vehicle load is varied by moving the spring bodily further from or nearer to the pivoted end of the plate 24 in the manner described above.

A main vehicle coil spring 86 mounted on the rear axle casing 30 in the described construction replaces the usual types of vehicle spring, and becomes operative when the vehicle load is so great as to compress the auxiliary spring beyond an intermediate range of action. A limiting device in the form of two depending L-shaped rods 82 each having a resilient stop 83, one at each side of the vehicle, is provided for limiting the downward movement of the plate 24 in relation to the chassis.

Figures 6, 7:
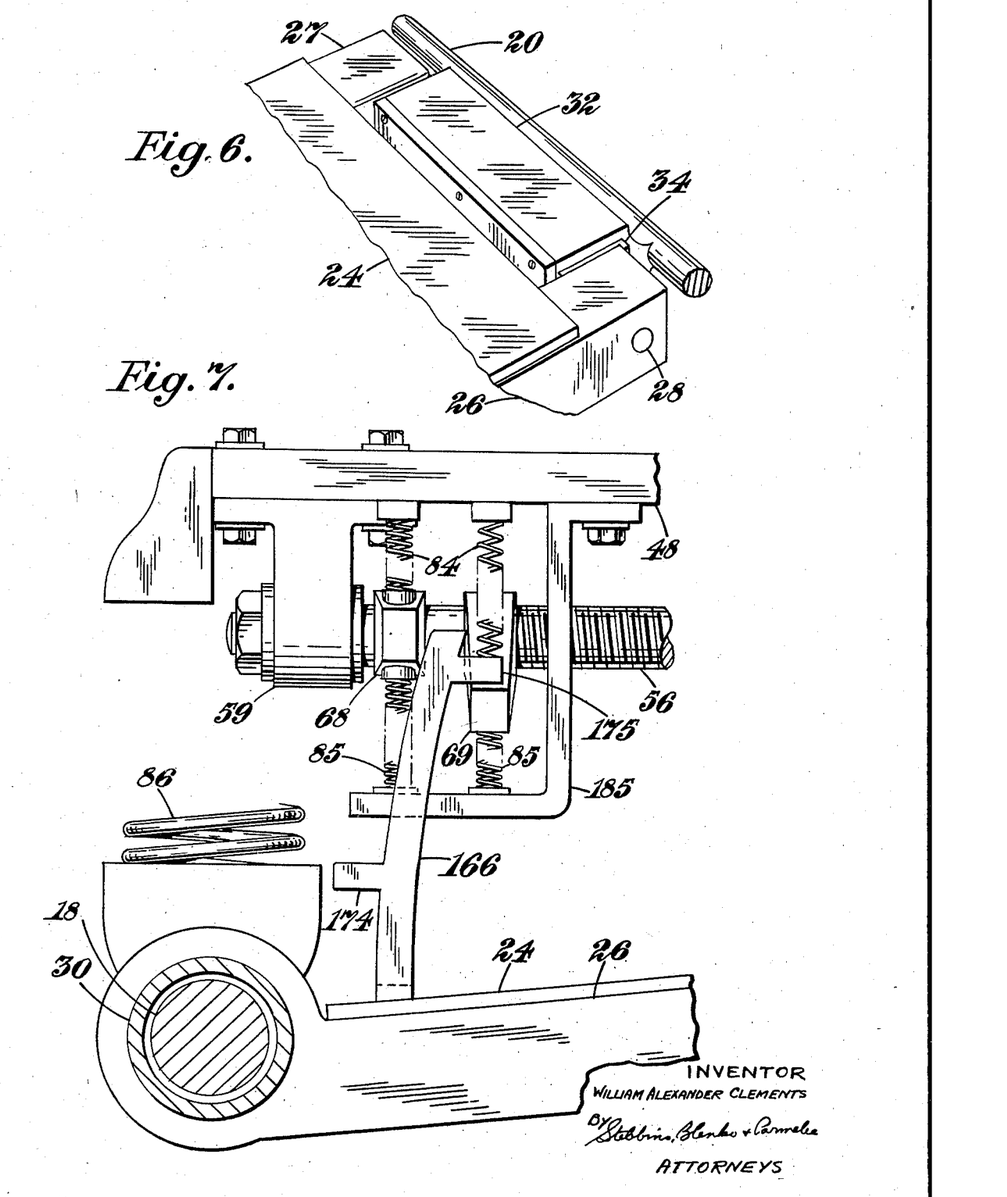
Figure 6 is a detail shown in perspective.
Figure 7 is a side elevation showing a modification.

Figure 7 shows a modified construction of lost-motion device for rocking the arms 68, 69 comprising a curved upstanding rod 166 carried by the plate 24 at any convenient position. This rod 166 carries two tappets 174 and 175 spaced apart along its length and arranged to rock the spring-controlled arms 68 and 69 respectively. In this construction the lower springs 85 are anchored to a bracket 185 depending from the chassis. As illustrated, the tappet 175 is operative and the arm 69 has been rocked downwards to rotate the spindle 56 in a direction to move the auxiliary springs bodily towards the front of the vehicle.

Figure 8:
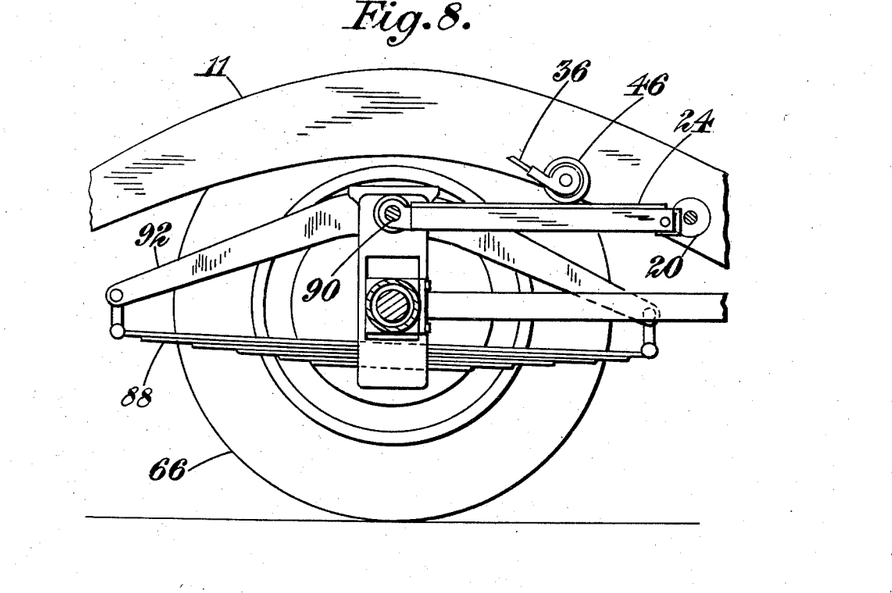
Figure 8 is a side elevation showing one form of mainspring in combination with a spring support according to the invention shown broken away.

The improved arrangement of auxiliary springs as described above may be applied to a vehicle having a main oscillatory spring of any convenient arrangement, for example, as illustrated in Figure 8, wherein a main semi-elliptical spring 88 is provided in known manner. The plate 24 has its front end pivoted at 20 as described above, and has its rear end pivotally connected at 90 to a frame member 92 forming a sprung-load-supporting part of the vehicle.

Figure 9:
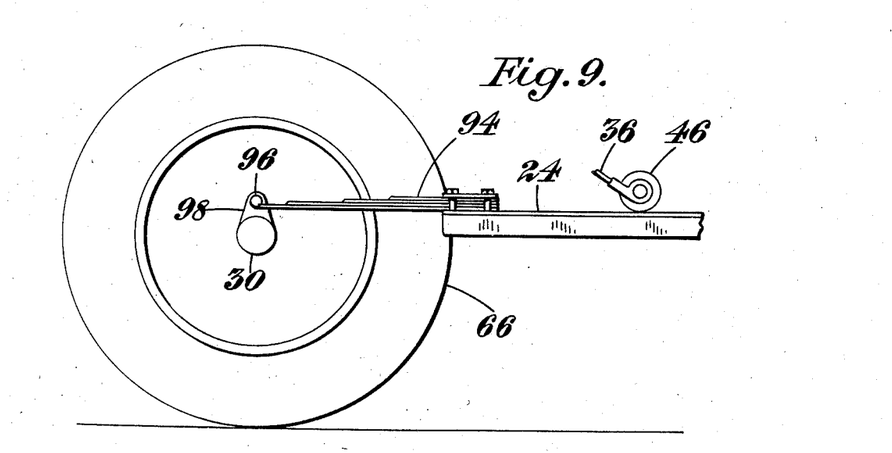
Figure 9 is a side elevation showing a modified detail according to the invention.

Alternatively, as shown in Figure 9, the plate 24 has its rear end fixed to the front end of a quarter elliptical spring 94, whereof the rear end is connected at 96 to a bracket 98 provided on the casing 39 of the axle of the rear wheels 66.

The invention provides a spring support which is considerably more flexible than those proposed heretofore and results in greater comfort to passengers and reduced vibration under varying conditions of load. For example, assuming that the vehicle has been lightly loaded and is then fully loaded, the plate 24 will occupy an upper position and the auxiliary springs will be moved to occupy a rear position. With a lighter load following a heavier load, the plate 24 can occupy a position slanting downwards from the front towards the rear, so that the auxiliary springs are moved towards the front end of the threaded spindle 56. Owing to the rigidity of the combination of the two plates 24 with the rear axle of the vehicle, lateral roll and lateral movement of the axle are greatly reduced. At the same time, a large proportion of the road shocks is not transmitted to the chassis owing to the flexibility of the auxiliary springs. This results in increased stability and road-holding properties.

Various modifications may be made in the details of construction described above without departing from the invention. For example, in somes cases, the position of the auxiliary spring may be reversed or inverted so that its coiled portion is carried by, and is movable along the supporting member and its end of elongated form bears against the chassis or a part attached thereto. Also, the shape of the auxiliary spring may differ from that shown and may be, for example of hairpin or U shape, with or without one or more coils at the closed end of the U. Moreover, a single plate or link may extend across the middle of the chassis for supporting all the auxiliary springs conjointly. Further, the screw-threaded spindle for shifting an auxiliary spring may be arranged to be turned manually. Again, the invention may be applied independently to each front wheel in an analogous manner. Alternatively, when at the front the pivotal axis of the supporting member may lie in the direction of length of the vehicle, and the auxiliary spring may be movable bodily transversely to that axis.

I claim:

1. In a vehicle, the combination with a main oscillatory spring, of an auxiliary oscillatory spring mounted to move bodily in the fore-and-aft direction of the vehicle, a lower supporting member for supporting one end of the auxiliary spring, and an upper supported member that is supported by the other end of the auxiliary spring and serves to carry at least part of the weight of the vehicle and its load, one end portion of which auxiliary spring is free to move in relation to the respective lower or upper member for permitting the mechanical advantage of the force acting to compress the auxiliary spring to increase as the reaction of the auxiliary spring against compression increases.

2. In a vehicle, the combination with a main oscillatory spring, of an auxiliary oscillatory spring, a lower supporting member for supporting the auxiliary spring, an upper supported member supported by the auxiliary spring that serves to carry at least part of the weight of the vehicle and its load, one end portion of which auxiliary spring is free to move in relation to the respective lower or upper member for varying the mechanical advantage of the force acting to compress the auxiliary spring, adjusting mechanism for moving the auxiliary spring bodily in opposite directions, and actuating means operated under the action of variable vehicle loads arranged to actuate said adjusting mechanism.

3. In a vehicle, the combination with a main oscillatory spring, of an auxiliary oscillatory spring, a lower supporting member for supporting the auxiliary spring, an upper supported member supported by the auxiliary spring that serves to carry at least part of the weight of the vehicle and its load, one end portion of which auxiliary spring is free to move in relation to the respective lower or upper member for varying the mechanical advantage of the force acting to compress the auxiliary spring, adjusting mechanism for moving the auxiliary spring bodily in opposite directions, and actuating means operated under the action of variable vehicle loads arranged to actuate said adjusting mechanism, which actuating means is arranged to be operated by the approximately vertical relative movements of the said supporting and supported members between which the auxiliary spring is situated.

4. In a vehicle, the combination with a main oscillatory spring, of an auxiliary oscillatory spring, a lower supporting member for supporting the auxiliary spring, an upper supported member supported by the auxiliary spring, one end portion of which auxiliary spring is free to move in relation to the respective lower or upper member for varying the mechanical advantage of the force acting to compress the auxiliary spring, a transverse bar mounted to move in the direction of length of the vehicle, said auxiliary spring having one end coiled about said transverse bar, an adjusting screw arranged to move the bar in the direction of length of the vehicle, and means arranged to turn the screw under the action of variable vehicle loads.

5. The combination of parts set forth in claim 4, wherein buffer means is arranged between the adjusting screw and the auxiliary spring.

6. The combination of parts set forth in claim 4, wherein frame members are fixed in parallel relation to the chassis extending in the direction of length thereof, two beams extend in said direction, one below each of said frame members, said transverse bar is non-rotatably carried by said beams, and anti-friction means is provided between each beam and the frame member above it.

7. The combination of parts set forth in claim 4, wherein the transverse bar has a resilient floating connection with the adjusting screw.

8. In a vehicle, the combination with a main oscillatory spring, of a plurality of auxiliary oscillatory springs, a lower supporting member for supporting one end of each of the auxiliary springs, an upper supported member supported by the other ends of the auxiliary springs that serve to carry at least part of the weight of the vehicle and its load, one end portion of each of which auxiliary springs is free to move in relation to the respective lower member for permitting the mechanical advantage of the force acting to compress the auxiliary springs to increase as the reaction of the auxiliary spring against compression increases, a transverse bar mounted to move in the direction of length of the vehicle, said auxiliary springs having each one end coiled about said transverse bar, an adjusting screw arranged to move the bar in the direction of length of the vehicle, means arranged to turn the screw under the action of variable vehicle loads, two frame members extending in the direction of length of the chassis and fixed thereto in spaced parallel relation, two beams lying one below each frame member and extending in the direction of their length, which transverse bar is non-rotatably carried by said beams, and carries said auxiliary springs spaced apart in parallel relation between said beams, two cross-pieces that have threaded connection with said adjusting screw and are spaced apart in parallel relation along the latter at opposite sides of said bar and are slidable on said frame members above said beams, a sleeve forming part of said transverse bar surrounds the adjusting screw with play between said cross-pieces, and springs arranged between the ends of said sleeve and said cross-pieces.

9. In a vehicle, the combination with a main oscillatory spring, of an auxiliary oscillatory spring, a lower supporting member for supporting the auxiliary spring, and an upper supported member that is supported by the auxiliary spring and serves to carry at least part of the weight of the vehicle and its load, one end portion of which auxiliary spring is free to move in relation to the respective lower or upper member for permitting the mechanical advantage of the force acting to compress the auxiliary spring to increase as the reaction of the auxiliary spring against compression increases, a transverse bar mounted to move in the direction of length of the vehicle, said auxiliary spring having one end coiled about said transverse bar, an adjusting screw arranged to move the bar in the direction of length of the vehicle, and means arranged to turn the screw under the action of variable vehicle loads, which means for turning the adjusting screw comprises two one-way clutch devices operative on the adjusting screw in opposite directions, two arms, one connected with each clutch device, and means carried by the said supporting member arranged to actuate said arms when the supporting member vibrates in positions at predetermined limits above and below the horizontal.

10. In a vehicle, the combination with main oscillatory springs, of at least two auxiliary oscillatory springs that are situated at opposite sides of the chassis between the longitudinals thereof, and mounted to move bodily in the fore-and-aft direction of the vehicle, two supporting members that are pivoted at their front ends to the chassis and are arranged each to support one of the auxiliary springs, upper supported means that is supported by the auxiliary springs and serves to carry at least part of the weight of the vehicle and its load, the lower end portion of each of which auxiliary springs is free to move in relation to its allotted pivoted supporting member for permitting the mechanical advantage of the force acting to compress the springs to increase as the reaction of the auxiliary springs against compression increases, and means connecting said pivoted supporting members at their rear ends to cause them to move in unison as a unitary structure for the purpose of preventing lateral roll of the vehicle.

11. In a vehicle, the combination with main oscillatory springs, of a plurality of auxiliary springs arranged in groups, each group containing at least two springs, which groups are arranged at opposite sides of the chassis between the longitudinals thereof, and are mounted to move bodily in the fore-and-aft direction of the vehicle, pivoted supporting members each arranged to support one group of the auxiliary springs, and upper supported means that is supported by the auxiliary springs and serves to carry at least part of the weight of the vehicle and its load, the lower end portion of each group of auxiliary springs is free to move in relation to its allotted pivoted supporting member for permitting the mechanical advantage of the force acting to compress the auxiliary springs to increase as the reaction of the auxiliary spring against compression increases, and means connecting said pivoted supporting members at their rear ends to cause them to move in unison as a unitary structure for the purpose of preventing lateral roll of the vehicle.

12. In a vehicle, the combination with main oscillatory springs, of at least two auxiliary oscillatory springs that are situated at opposite sides of the chassis between the longitudinals thereof, and are mounted to move bodily in the fore-and-aft direction of the vehicle, two supporting members that are pivoted at their front ends to the chassis and are arranged each to support one of the auxiliary springs, upper supported means that is supported by the auxiliary springs and serves to carry at least part of the weight of the vehicle and its load, the lower end portion of each of which auxiliary springs is free to move in relation to its allotted pivoted supporting member for permitting the mechanical advantage of the force acting to compress the springs to increase as the reaction of the auxiliary springs against compression increases, and means connecting said pivoted supporting members to cause them to move in unison as an unitary structure for the purpose of preventing lateral roll of the vehicle.

13. In a vehicle, the combination with main oscillatory springs, of a plurality of auxiliary springs arranged in groups, each group containing at least two springs, which groups are arranged at opposite sides of the chassis between the longitudinals thereof, and are mounted to move bodily in the fore-and-aft direction of the vehicle, pivoted supporting members each arranged to support one group of the auxiliary springs, and upper supported means that is supported by the auxiliary springs and serves to carry at least part of the weight of the vehicle and its load, the lower end portion of each group of auxiliary springs being free to move in relation to its allotted pivoted supporting member for permitting the mechanical advantage of the force acting to compress the auxiliary springs to increase as the reaction of the auxiliary spring against compression increases, and means connecting said pivoted supporting members to cause them to move in unison as an unitary structure for the purpose of preventing lateral roll of the vehicle.

WILLIAM ALEXANDER CLEMENTS.